(12) United States Patent
Fatemi et al.

(10) Patent No.: US 9,009,506 B2
(45) Date of Patent: Apr. 14, 2015

(54) ENERGY EFFICIENT MICROPROCESSOR PLATFORM BASED ON INSTRUCTIONAL LEVEL PARALLELISM

(75) Inventors: Hamed Fatemi, Eindhoven (NL); Ajay Kapoor, Eindhoven (NL); Jose Pineda de Gyvez, Eindhoven (NL)

(73) Assignee: NXP B.V., Eindhoven (NL)

( * ) Notice: Subject to any disclaimer, the term of this patent is extended or adjusted under 35 U.S.C. 154(b) by 235 days.

(21) Appl. No.: 13/410,247

(22) Filed: Mar. 1, 2012

(65) Prior Publication Data

US 2013/0232359 A1 Sep. 5, 2013

(51) Int. Cl.
 G06F 1/32 (2006.01)
 G06F 15/00 (2006.01)
 G06F 9/38 (2006.01)
 G06F 9/50 (2006.01)

(52) U.S. Cl.
 CPC ............ G06F 9/3836 (2013.01); G06F 9/5094 (2013.01)

(58) Field of Classification Search
 CPC .............................. G06F 9/3836; G06F 9/5094
 USPC ........................ 713/320; 712/23, 24, 208, 220
 See application file for complete search history.

(56) References Cited

U.S. PATENT DOCUMENTS 6,826,704 B1 * 11/2004 Pickett ........................... 713/320
6,895,520 B1 * 5/2005 Altmejd et al. ............... 713/324
7,107,471 B2 * 9/2006 Feierbach ..................... 713/324
7,962,770 B2 * 6/2011 Capps et al. .................. 713/300
8,291,201 B2 * 10/2012 Schwinn et al. ............. 712/229

OTHER PUBLICATIONS

"The Cell Project at IBM Research," available at: http://www.research.ibm.com/cell/, last accessed Oct. 18, 2011, + page.
Calhoun et al. "Flexible Circuits and Architectures for Ultralow Power," Proceedings of the IEEE, vol. 98, No. 2, (Feb. 2010), pp. 267-282.
"Pentium" Wikipedia, available at: http://en.wikipedia.org/wiki/Pentium, last accessed Oct. 18, 2 011, 11 pages.
"PowerPC" Wikipedia, available at: http://en.wikipedia.org/wiki/PowerPC, last accessed Oct. 18, 2011, 12 pages.
Kleihorst et al. "Xetal: A Low-Power High-Performance Smart Camera Processor" The 2001 IEEE International Symposium on Circuits and Systems, vol. 5, (May 2001) pp. 215-218.
Fujita et al. "A 10 GIPS SIMD Processor for PC-based Real-Time Vision Applications—Architecture, Algorithm Implementation and Language Support" Proceedings of the 1997 Computer Architectures for Machine Perception, (1997) pp. 22-32.

(Continued)

*Primary Examiner* — Stefan Stoynov

(57) ABSTRACT

Embodiments of a processing architecture are described. The architecture includes a fetch unit for fetching instructions from a data bus. A scheduler receives data from the fetch unit and creates a schedule allocates the data and schedule to a plurality of computational units. The scheduler also modifies voltage and frequency settings of the processing architecture to optimize power consumption and throughput of the system. The computational units include control units and execute units. The control units receive and decode the instructions and send the decoded instructions to execute units. The execute units then execute the instructions according to relevant software.

9 Claims, 8 Drawing Sheets

(56) References Cited

OTHER PUBLICATIONS

Chandrakasan et al. "Low-Power CMOS Digital Design" IEEE Journal of Solid-State Circuits, vol. 27, Issue 4, (Apr. 1992), pp. 473-484.
Puiatti "Instruction-Level Parallelism for Low-Power Embedded Processor" Thesis, Lausanne, EPFL, (1999), 156 pages.
"TriMedia (mediaprocessor)" Wikipedia, available at: http://en.wikipedia.org/wiki/TriMedia_(mediaprocessor), last accessed Oct. 18, 2011, 4 pages.
"PA-RISC" Wikipedia, available at: http://en.wikipedia.org/wiki/PA-RISC, last accessed Oct. 18, 2011, 4 pages.
Meijer "Body Bias Tuning in Modern Digital Integrated Circuit Designs" NXP Semiconductors, (Dec. 2008), 97 pages.

* cited by examiner

ENERGY EFFICIENT MICROPROCESSOR PLATFORM BASED ON INSTRUCTIONAL LEVEL PARALLELISM

BACKGROUND

Various techniques and architectural configurations have been explored to maximize the throughput of a computing platform. One way to increase computational performance is to increase the frequency of the clock cycle, thereby increasing the number of actions performed in any given time period. While effective at increasing throughput, increasing the frequency of the clock cycle is accompanied by a substantial increase in the power consumption of the computing system. Another way to increase computational performance is to increase the amount of parallelism supported by the architecture of the computing platform. One such method of parallel architecture is Instruction Level Parallelism (ILP), in which a single instruction stream is split over multiple and independent computational units. However, similar to the increased frequency of the clock-cycle, total power consumption increases with each additional parallel unit, decreasing the energy efficiency of the computing platform. Some techniques have been implemented to optimize the parallelization of various processing units, but have done so at the expense of increasing the area of the architecture and power consumption due to the complexity of the implementations and additional circuitry required. In fact, many conventional throughput optimization techniques do not consider energy efficient computation as a main target. Rather, conventional techniques mainly look to achieve the highest throughput out of a computing platform.

Other methods have been applied to reduce the power consumption of a system. A commonly applied technique is voltage scaling, in which the power supply voltage is lowered to reduce the amount of power consumption. However, with the decrease in voltage and frequency, throughput of the system goes down, decreasing the overall performance of the computing platform.

Other commonly used optimization strategies of hardware architecture consider either throughput maximization or power minimization as a primary goal, because one parameter is generally optimized at the direct cost of the other parameter.

SUMMARY

Embodiments of a processing architecture are described. In one embodiment, the processing architecture includes a fetch unit configured to fetch a set of instructions. The processing architecture further includes a scheduler to receive instructions from the fetch unit. The scheduler may be configured to change the voltage and frequency settings of a processor to optimize power consumption and throughput of the processing architecture. The scheduler is configured to schedule the instructions and allocate those instructions to a plurality of computational units. The computational units include a plurality of control units and a plurality of execution units. The control units are coupled to the scheduler and are configured to receive and decode the instructions. The execution units are coupled to corresponding control units and are configured to receive and execute the decoded instructions.

Embodiments of an intelligent instruction scheduler are also described. In one embodiment, the instruction scheduler is embedded within a processor. The scheduler is also configured to fetch instructional data and identify dependencies within the instructional data. The scheduler is further configured to create a schedule of operations to be performed on the instructional data and send the instructional data and schedule to a plurality of computational units. The scheduler may also be configured to modify the voltage and power settings of the processor to optimize power consumption and throughput of the processor.

Embodiments of a method are also described. In one embodiment, the method is a process for scheduling and executing instructions over multiple computational units on a processor. The method includes fetching the instructional data and determining dependencies within the instructional data. This involves determining whether results of computations within the instructional data are required to be performed in the same clock cycle or not. The method further includes creating a schedule of operations to be performed on the instructional data. The method further includes distributing the instructional data and schedule to a plurality of computational units. The method also includes decoding and executing the instructional data. The method also includes modifying the power settings of the processor to optimize power consumption and throughput of the processor. The method also stores the computed data in a register file shared by the plurality of computational units.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
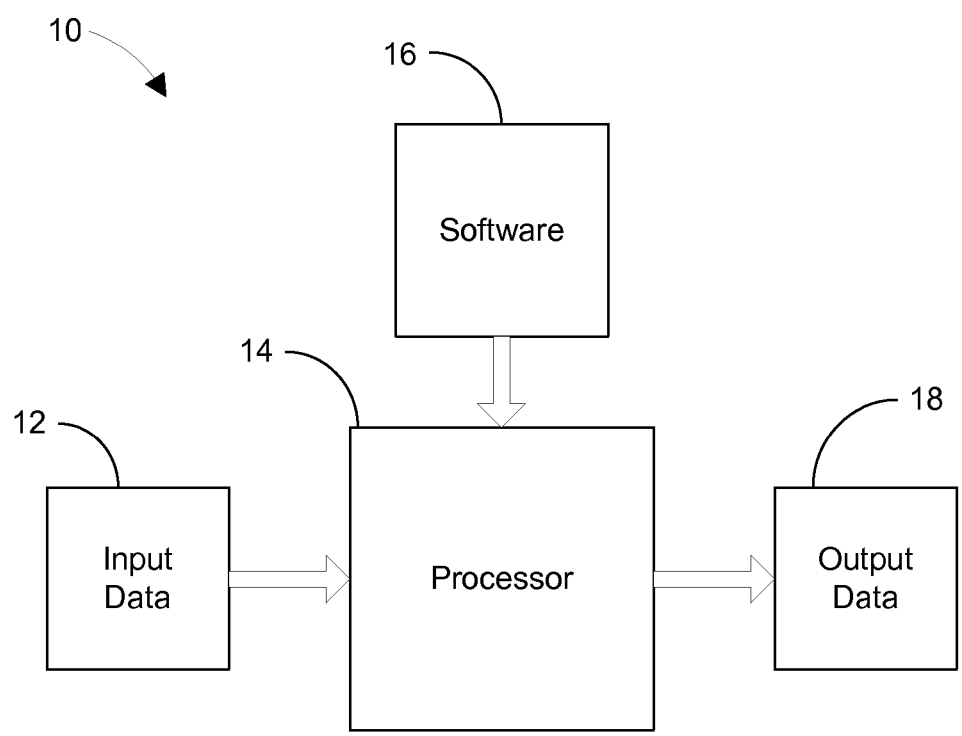
FIG. 1 discloses a schematic diagram of one embodiment of processor receiving and processing data.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

While many embodiments are described herein, at least some of the described embodiments include a processing architecture. In this description, "architecture" may refer to any processing platform, combination of processing platforms, or configuration of components on one or more processing platforms. Also, at least some of the embodiments include the use of computational units. In this description, "computational unit" may refer to any unit that performs operations on data, such as, for example, a control unit that decodes data or an execute unit that executes data. In the description, computational units may refer to a single unit or multiple units that perform similar or different operations. Further, at least some embodiments include reference to software. In this description, "software" may refer to any relevant software used in conjunction with the processor or architecture.

FIG. 1 discloses a schematic diagram of one embodiment of a system 10 wherein a processor 12 receives and processes data according to the instructions of accompanying software 16. In the illustrated system 10, a processor 14 receives input data 12 and processes the data 12 according to instructions supplied by relevant software 16. The processor 14 fetches, decodes, executes, and otherwise manipulates the data 12 according to the software 16 instructions and outputs the data in the form of output data 18. The embodiments described herein disclose a processing architecture and method of improving throughput of data through the processor as well as improving the energy efficiency of data computation in achieving the desired throughput.

One method of achieving energy efficient computations is to apply voltage scaling techniques. Traditionally, voltage scaling is statically applied, but is also frequently dynamically applied. The dynamic power consumption of a digital system is proportional to:

$$P_{dynamic} \propto CV_{dd}^2$$

where C is the switching capacitance and $V_{dd}$ is the power supply voltage. By lowering the power supply ($V_{dd}$), the dynamic power consumption reduces quadratically. However, reducing the power supply of a system generally decreases the throughput (speed) supported by the system and overall processing speed decreases. This reduction in speed is represented by the following:

$$T_{delay} \propto \frac{V_{dd}}{(V_{dd} - V_{th})^\alpha}$$

where $T_{delay}$ represents the proportional reduction of speed of a processor, $V_{dd}$ is the voltage power supply, and $V_{th}$ is the threshold voltage. Hence, the relative change in the frequency supported by a system on two different power supplies ($V_{dd1}$, $V_{dd2}$) is given by:

$$\frac{Freq_{Vdd1}}{Freq_{Vdd2}} = \frac{V_{dd2}}{(V_{dd2} - V_{th})^\alpha} \frac{(V_{dd1} - V_{th})^\alpha}{V_{dd1}},$$

further illustrating that the decrease in voltage through voltage scaling will result in the overall reduction in speed of the processing platform.

In at least one embodiment of the disclosed processing architecture, voltage scaling is used in addition to utilization of parallel units for performing parallel computations. The number of parallel units (N) required to compensate for throughput reduction is expressed by:

$$N_{@Freq2} = \frac{Freq_{Vdd1}}{Freq_{Vdd2}} = \frac{V_{dd2}}{(V_{dd2} - V_{th})^\alpha} \frac{(V_{dd1} - V_{th})^\alpha}{V_{dd1}}$$

where N represents the number of parallel units as compared with a system that has a single line of processing units. However, as the number of parallel units increase, the overhead capacitance of parallelization due to multiplexing will take effect. The total switching capacitance in the system is expressed by:

$$\frac{C_{new}}{C_{old}} = [N + \lambda(N - 1)]$$

where $C_{new}$ and $C_{old}$ represent the switching capacitance of the new parallel operating system and old single computation unit system respectively, N represents the number of parallel units, and λ represents the overhead of additional hardware. The new system will run at N times lower frequency while running at the lower voltage. Therefore, total power consumption in the system can be given by:

$$\frac{P_{Vdd2}}{P_{Vdd1}} = [N + \lambda(N-1)]\frac{V_{dd2}^2}{V_{dd1}^2} \times \frac{1}{N}$$

Figure 6:
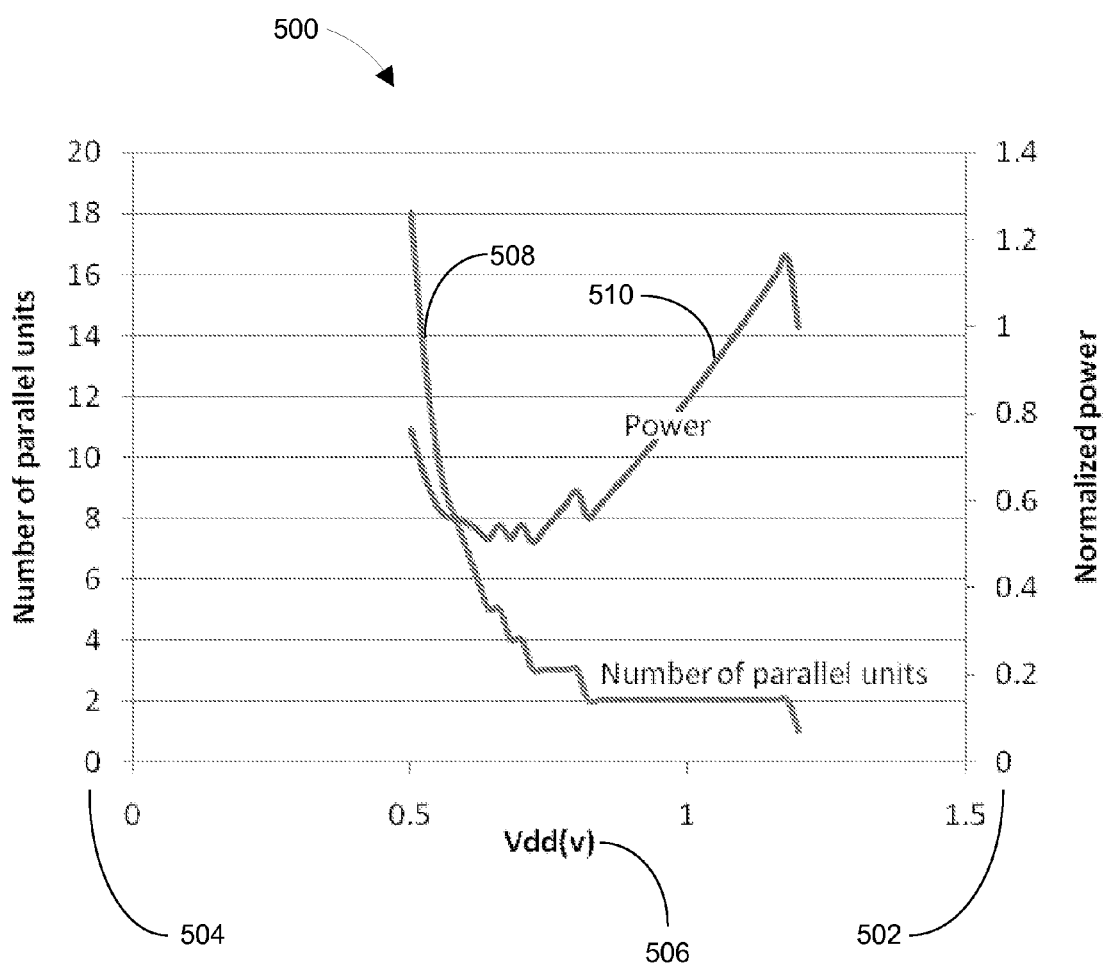
FIG. 6 discloses a graph showing power performance of a conventional computer processing architecture assuming very high utilization of parallel units.

The general effect of power reduction in parallel operating systems is illustrated in FIG. 6. The graph is based on data in CMOS90 process with a nominal power supply voltage ($V_{dd}$) =1.2V. The X-axis shows the power supply voltage 506. A first Y-axis on the left hand side shows the number of parallel units 504 being used. A second Y-axis on the right hand side shows the ratio of power consumed 502 by a system with multiple parallel computing units as compared to a system with a single line of computing units operating at 1.2 V. As the number of parallel units 508 jumps from 1 to 2 units, there is an initial spike in power consumption 510 due to switching capacitance, effects of overhead hardware ($\lambda$ is estimated to be about 0.15), and other factors. As the power supply is lowered, the power consumption 510 goes down, while maintaining a level of data throughput comparable to the single-core system at 1.2 V. As shown in the graph 500, the ratio of power consumption 510 between a two-parallel operating platform and a single core platform is approximately 0.56 to achieve the same throughput. Further, the maximum power savings is approximately 0.5 when the number of parallel units increases to three.

Figure 7:
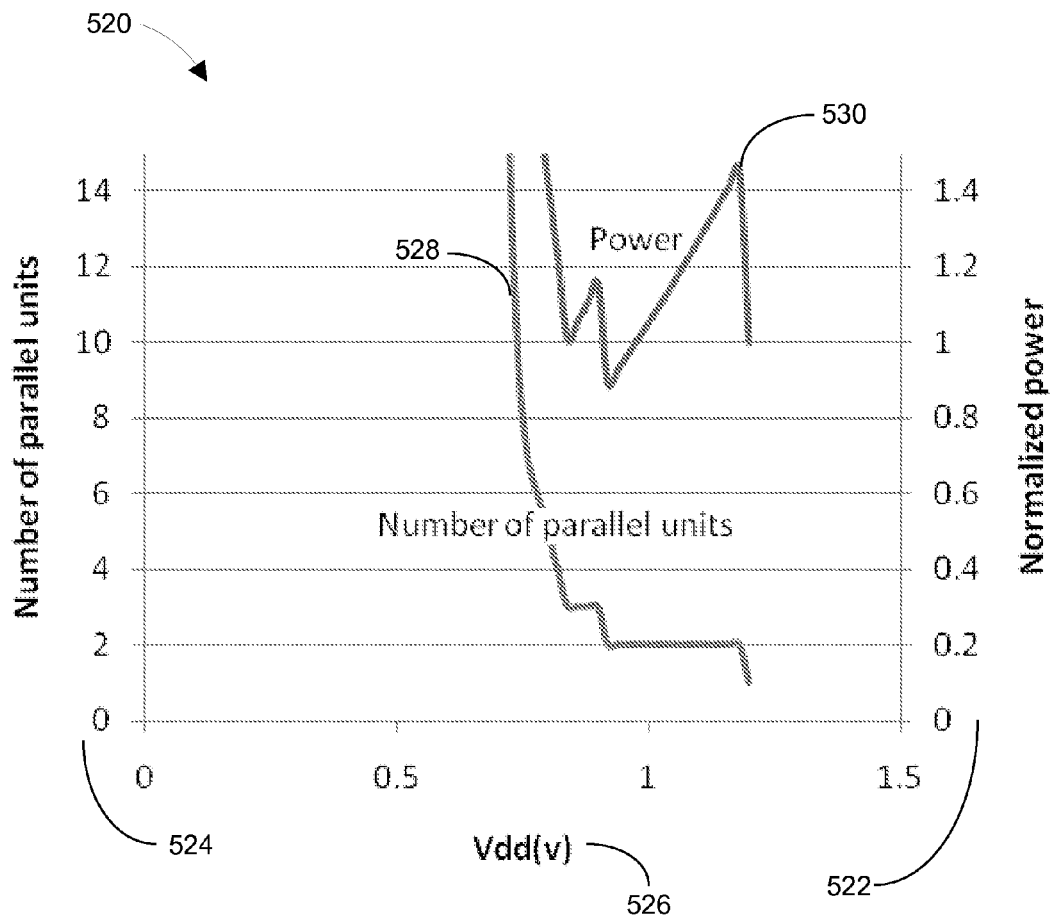
FIG. 7 discloses a graph showing power performance of a conventional computer processing architecture assuming approximately 70% utilization of parallel units.

FIG. 6 discloses the general effect of power reduction in a system under the assumption of 100% utilization of the parallel units. In general, however, it is not possible to fully parallelize an application. A more general analysis and corresponding results may be derived by decomposing the application into two parts: (1) a serial part, and (2) a parallel part. This average power consumption may be computed using Amdahl's law:

$$\frac{P_{Vdd2}}{P_{Vdd1}} = [N + \lambda(N-1)]\frac{V_{dd2}^2}{V_{dd1}^2}\left[1 - P + \frac{P}{N}\right]$$

where P represents the amount of parallelization possible in the application. Based on this modification, the results of FIG. 6 are recomputed and the results are shown in FIG. 7 assuming a 70% parallelization of computational units. Similar to FIG. 6, the graph 520 of FIG. 7, the X-axis represents the supply voltage 526 of the system, a first Y-axis on the left hand side shows the number of parallel units 524, and a second Y-axis on the right hand side shows the ratio of power consumed 522 by a system with multiple parallel computing units as compared to the system with a single line of computing units operating at 1.2 V. In this embodiment, when the number of parallel units 528 jumps from one to two, the power consumption 530 spikes initially and levels off to about 0.9 as the power supply 526 is lowered to achieve a comparable throughput to the single-core system operating at 1.2 V. In practice, however, the average amount of parallelization in an application programming code is about 60%, further reducing the power savings in conventional embodiments of processing architecture. This increases the need for a more efficient method of optimizing power consumption.

Figure 8:
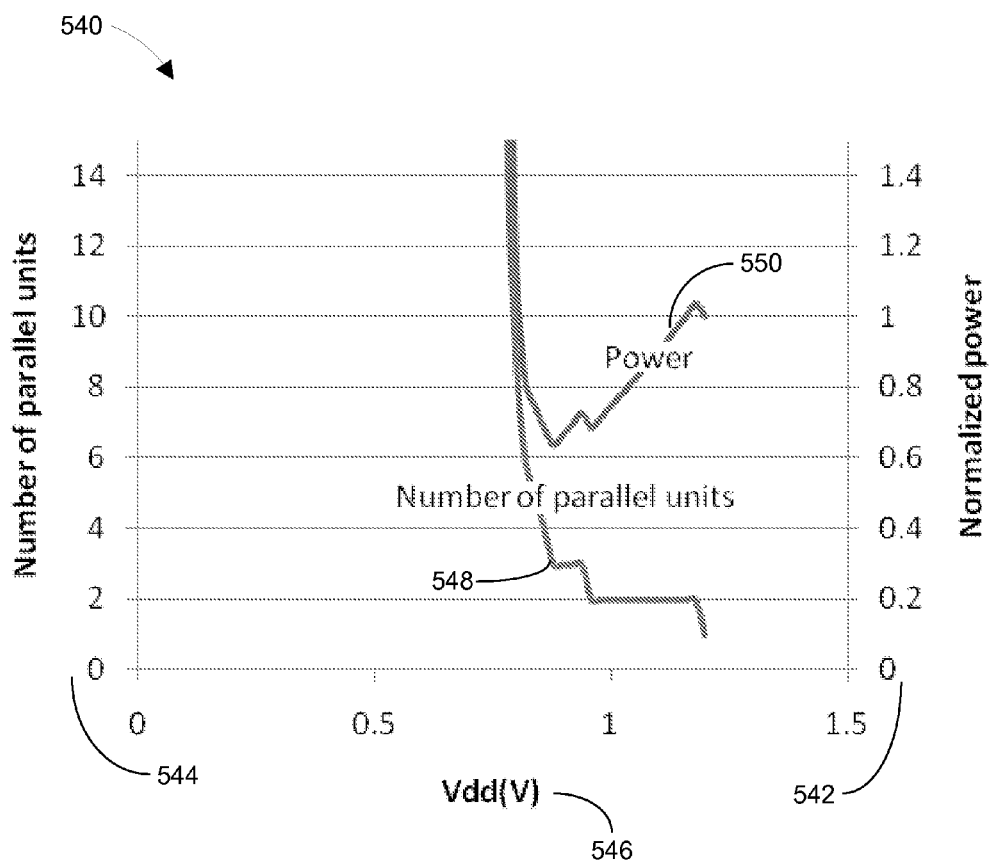
FIG. 8 discloses a graph showing power performance of one embodiment of a computer processing architecture assuming approximately 60% utilization of parallel units.

In order to achieve a higher level of throughput while maintaining the lower power consumption due to voltage scaling, at least one embodiment of the processing architecture modifies the architecture by combining newly placed parallel units in a novel configuration, specifically adding parallel computation devices in a single-core processor without the need to add additional processing units in parallel. These modifications permit the processor with the new architecture to behave similarly to multiple processors in parallel within the functionality of a single-core processor. This also modifies the total switching capacitance proportional to the number of parallel units, changing the calculations discussed herein. Therefore, the total power consumed is given by the following expression:

$$\frac{P_{Vdd2}}{P_{Vdd1}} = [N(1-\beta) + \lambda(N-1)]\frac{V_{dd2}^2}{V_{dd1}^2} \times \frac{1}{N}$$

where $\beta$ represents the fractional area or capacitance reduction per parallel unit. By not introducing additional processors, $\beta$ is maximized, thereby decreasing the power consumption while maintaining a more efficient parallel operation architecture. This efficiency is illustrated in the graph 540 illustrated in FIG. 8. Similar to the previous graphs discussed herein, the graph 540 includes an X-axis representing a supply voltage 546 of the system, a first Y-axis on the left hand side showing the number of parallel units 544, and a second Y-axis on the right hand side showing the ratio of power consumed 542 by the new system with multiple computational units as compared to the system with a single line of computational units operating at 1.2 V. Further, in achieving the computations, parallel utilization was assumed to be approximately 60%, $\beta$ was 0.2 and $\lambda$ was 0.15. As shown by the graph 540, as the number of parallel computational units 548 jumps to two, the power consumption 550 levels off to about 0.66 power savings while achieving the throughput of the single-line of computational units. The graph 540 also shows that the new processing architecture continues to optimize power consumption when 6-8 parallel computational units are being utilized.

Figure 2A:
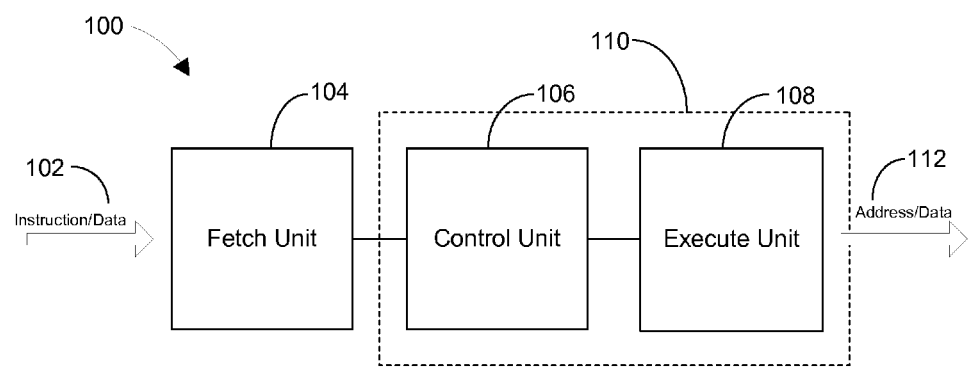
FIG. 2A discloses a schematic diagram of one embodiment of a computer processing architecture.

FIG. 2A discloses a schematic diagram of one embodiment of a computer processing architecture. The architecture 100 includes a feed of instructional data 102. A fetch unit 104 fetches the instructional data 102 and feeds the instructional data 102 to a plurality of computations units 110. The first computational unit is a control unit 106 which decodes the instructional data 102. The control unit prepares the data 102 for execution by feeding the decoded data into an execute unit 108. Upon execution, the execution data 112 may be stored, displayed, discarded, addressed to another location on the processor, or treated according to the relevant software being used with the processor.

Figure 2B:
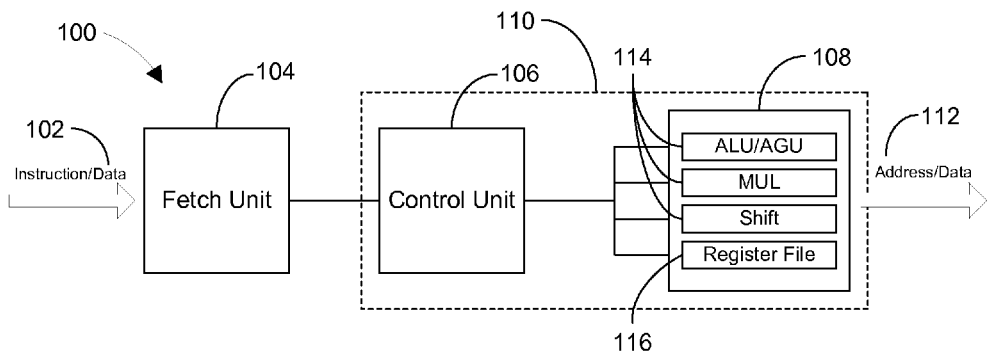
FIG. 2B discloses a schematic diagram of a more detailed embodiment of the computer processing architecture of FIG. 2A.

FIG. 2B discloses a schematic diagram of one embodiment of a computer processing architecture 100. The architecture 100, similar to FIG. 2A, includes instructional data 102 fetched by a fetch unit 104. The instructional data 102 includes instructions to be processed and executed by the processing architecture 100. The fetch unit 104 feeds the data 102 into a control unit 106 for decoding. Upon decoding the instructional input data 102, the control unit 106 feeds the decoded data into an execution unit 108 to perform computations according to the relevant software. The illustrated embodiment discloses some possible components of an execution unit 108, such as, for example, ALU/AGUs, MULs, or Shift Units 112 for a variety of computational purposes. The execution unit 108 may also include a register file 114 for storing, memory, or other computational purposes.

Figure 3A:
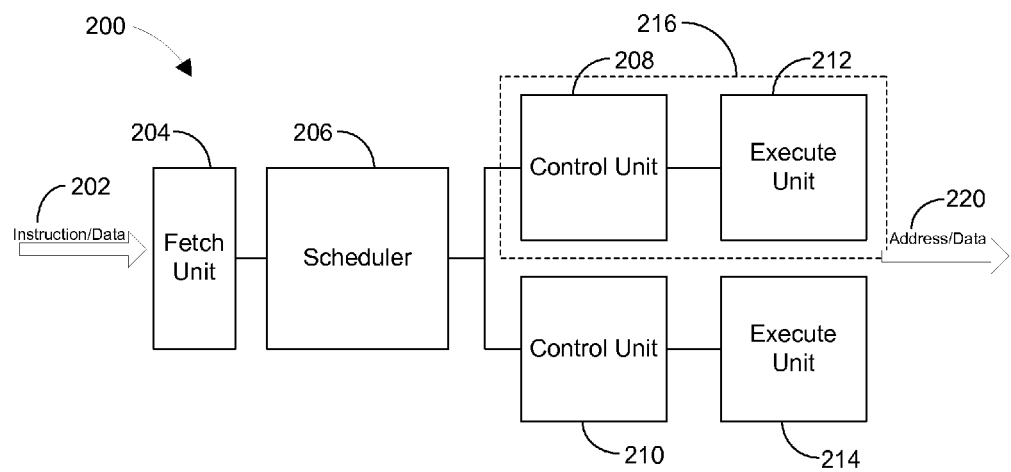
FIG. 3A discloses a schematic diagram of another embodiment of a computer processing architecture with multiple computational units.

FIG. 3A discloses a schematic diagram of one embodiment of a computer processing architecture 200 with multiple computational units 216. The architecture 200 includes instructional data 202 that is fetched by the fetch unit 204. The fetch unit 204 may include a scheduler 206 within the fetch unit 204 or may feed instructional data 202 to a separate scheduling component 206, as illustrated in the depicted embodiment. The scheduler 206 creates a schedule based on dependencies within the informational data 202 and sends the informational data 202 accompanied by a schedule to a plurality of control units 208, 210. Each control unit 208, 210 is configured to receive the schedule and instructional data 202 and decode the instructional data 202 in preparation to be sent to a plurality of execute units 212, 214.

In creating a schedule for distribution of instructional data 202, the scheduler 206 analyzes dependencies within the instructional data 202 and determines whether computations to be performed on the instructional data 202 are dependent on results of other computations to be performed on the instructional data 202. For example, if two operations were contained in the instructional data 202, where the second operation required the result of the first operation, then there would be a dependency within the instructional data 202. The scheduler 206 would then create a schedule to ensure that the instructions would be processed and executed in the most optimal way, without cutting off the flow of additional instructions, and still ensuring that the instructions were performed in the correct order. In determining dependencies within the instructional data 202, the scheduler partially decodes the instructions and determines whether the source of an instruction is the same as the result of another instruction. For example, in a case of two instructions, the scheduler would partially decode the first and second instructions to determine their respective sources and destinations. If the source or operand of the second instruction is the same as the destination of the first instruction, then a dependency would exist, and the scheduler would create a schedule to optimize the operations associated with those instructions.

In one embodiment, the schedule is created by detecting dependencies within the instructional data 202 where computations to be performed are dependent on results of other computations within the same processor clock cycle. To remove this dependency, the scheduler sends first and second instructions to different series of computational units 216 by default. If there is a dependency within the same clock cycle, the scheduler 206 sends a No Operation Performed (NOP) operation to the second series of computational units. When the clock cycle is finished, the second series of computational units may then use the result of the first computation and perform the second computation. The NOP operation functions to lower the overhead of the scheduler and allows the first computational unit to then perform additional computations while the second computational unit resolves the dependency. This is a very simple scheduling which allows for substantial optimization of processing without a dramatic increase in the overhead of the processing architecture. Further, the scheduler allows for a more continuous feed of instructional data 202 to the computational units 216, and eliminates unnecessary communications between the fetcher, scheduler and computational units.

Figure 3B:
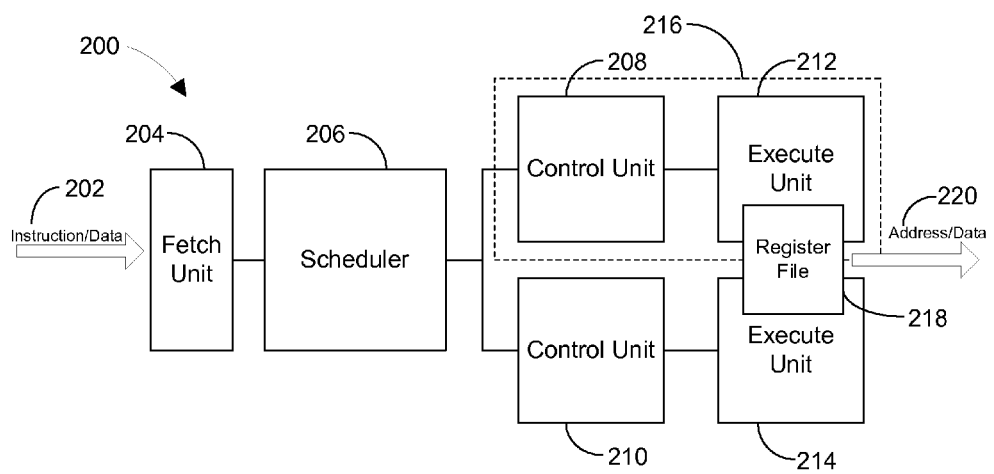
FIG. 3B discloses a schematic diagram of another embodiment of a computer processing architecture with multiple computational units and a shared register file.

When a scheduler 206 determines that dependencies between computations exist, but that they are to be performed in different clock cycles, the scheduler 206 does not need to allocate special instructions for computation of those units, because of the shared information between computational units 216, and the use of a common register file 218, further described in relation to FIG. 3B. Alternatively, in some embodiments the scheduler 206 may resolve these dependencies by feeding instructional data 202 to the same computational units 216, rather than separate lines of computational units 216 making it unnecessary to recall the results of prior computations from the fetch unit, scheduler, or other computational units 216. This eliminates additional processing steps that would otherwise be required in the absence of the scheduling function of the disclosed architecture 200.

In addition to creating a schedule and parsing instructions between computational units 216, some embodiments of the scheduler 206 may also be configured to track the number of dependencies in the instructional data and determine to what level each of the lines of computational units 216 are being utilized. The scheduler 206 may then be configured to adjust the voltage and clock frequency settings of the processing architecture in balancing and optimizing the throughput and power consumption of the architecture based on the dependencies and utilization of the computational units 216. In situations where a higher degree of utilization of multiple computational units 216 is present, the scheduler 206 instructs the processor to operate in a low-power mode reducing voltage and frequency, thereby increasing energy efficiency of the system without sacrificing throughput performance. In situations where a lower degree of utilization of multiple computational units 216 is present, the scheduler 206 instructs the processor to operate in a high-power mode increasing voltage and frequency, thereby maintaining a high level of throughput performance notwithstanding the underutilization of multiple computational units 216. In this way, the processing architecture ensures that a desired level of throughput is maintained notwithstanding the changing utilization of multiple computational units 216. In some embodiments, even in situations where the utilization of multiple computational units 216 is normal or high, the scheduler 206 may instruct the processor to operate in a high-power mode increasing the voltage and frequency, thereby causing the processing architecture 200 to achieve a higher level of throughput. The utilization of multiple computational units 216 need not be considered in every embodiment. This adjusting of voltage and frequency settings optimizes the power consumption and throughput of the processing architecture and allows a processing device to maintain a high level of throughput while consuming the least amount of power possible.

FIG. 3B discloses a schematic diagram of one embodiment of a computer processing architecture 200 with multiple computational units 216 and a shared register file 218. Similar to FIG. 3A, the architecture 200 includes instructional data 202 that is fetched by a fetch unit 204. The fetch unit 204 may include a scheduler 206 or send the fetched data 202 to a scheduler 206 to create a schedule based on detected dependencies within the instructional data 202. The scheduler 206 sends the data 202 and schedule to two control units 208, 210, although other embodiments may include two or more control units. The control units 208, 210 decode the data 202 and send the decoded data to a plurality of execute units 212, 214. The execute units 212, 214 then perform the executions according to the relevant software and do so according to the schedule created by the scheduler 206. In at least one embodiment, the execute units 212, 214 share a common register file 218 in which the execute units 212 may store and/or draw information from in order to complete their tasks as appointed by the relevant software.

In at least one embodiment, the register file 218 is shared by a plurality of execute units 212, 214. One advantage of a shared register file 218 is the immediate access by each of the execute units 212, 214 to the results of computations performed by other execute units 212, 214. Where a register file 218 is not shared between execute units 212, 214 in various computer architectures, various computational units 216 are required to interact with a fetch unit 204 in order to recognize dependencies and retrieve needed information for performing result dependant tasks. In embodiments where a register file 218 is shared between multiple execute units 212, 214, it is no longer necessary in many instances for the execute units 212, 214 to retrieve additional information from the fetch unit 204. By limiting the need for interaction between the execute units 212, 214, the fetch unit 204, and input data stream 202, the shared register file 218 decreases the amount of work that the processing architecture 200 is required to perform in the processing and computing the instructional data 202. This increases the throughput of the architecture 200 while permitting the processor to operate at a lower power setting, thereby decreasing power dissipation without sacrificing performance.

Figure 4:
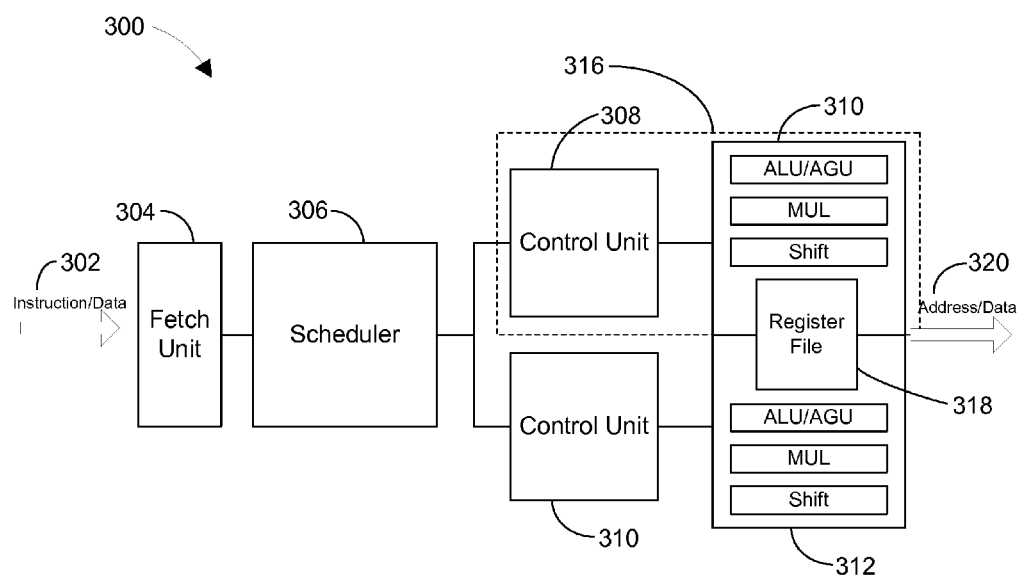
FIG. 4 discloses a schematic diagram of a more detailed embodiment of the computer processing architecture with multiple computational units and the shared register file of FIG. 3B.

FIG. 4 discloses a schematic diagram of one embodiment of a computer processing architecture 300 with multiple computational units 316 and a shared register file 318. The disclosed architecture 300 includes instructional data 302 fetched by a fetch unit 304. The fetch unit 304 sends data to a scheduler 306 which creates a schedule based on dependencies within the instructional data 302, as discussed in relation to FIG. 3A. The scheduler 306 sends the data 302 and schedule to a plurality of computational units 316. In at least one embodiment, each computational unit 316 includes a control unit 308, 310 and a corresponding execute unit 312, 314. In the illustrated embodiment, the architecture 300 includes two computational units 316, but may include additional computational units 316 in other embodiments. Further, while the execute units 310, 312 in the illustrated embodiment includes additional features, such as ALU/AGU, MUL, and Shift units, each execute unit 312, 314 may include other features not disclosed in the illustrated architecture 300.

While each control unit 308, 310 decodes the instructional data 302 and sends decoded information to a corresponding execute unit 312, 314, the disclosed architecture 300 includes a register file 318 shared by each of the execute units 312, 314. The shared register file 318 enables multiple execution units 312, 314 to have access to the results of computations of instructional data 302 without the need for direct communication with the fetch unit 304 or data stream 302. Further, because each execute unit 312, 314 receives decoded data from a corresponding control unit 308, 310, and may not necessarily have access to more than the one corresponding control unit 308, 310, the shared register file 318 provides the possibility for execute units 312, 314 to have access to the informational data 302 fed through other lines of computation.

A feature of one embodiment of the disclosed architecture 300 is the ability of a single core processor to have dual core functionality without affecting the viewpoint of a user. In many conventional processing architectures, the processing throughput and power consumption is optimized only through execution of the software designed for that particular architecture. In these embodiments, a programmer or compiler of software needs to be aware of the processing architecture in order to exploit the architectural advantage. The architecture is therefore not transparent from the user's point of view, as the software needs to be compatible with that specific architecture. However, in at least one embodiment of the disclosed architecture 300, the dual core functionality is achieved through internal logic and processes while the system appears as a single processor platform from the viewpoint of the user. For example, the scheduler 306 creates a schedule of for a line of multiple computational units 316 to perform computations in parallel without the necessity of the accompanying software directing the processor to perform computations in a specific order. This allows for faster parallel processing without the need of specialized software to direct the processor from the user's point of view. The new architectural platform is therefore capable of operating in the same settings as the old architectural platform.

In some embodiments, the dual core functionality is further enhanced by the register file 318 shared between execute units 312, 314, granting access to each of the execute units 312, 314 for all of the computations performed on the informational data 302. The shared register file 318 makes it possible for the execute units 312, 314 to perform the required operations on the decoded data without the need for constant communication between the fetch unit 304, control units 308, 310, and execute units 312, 314. This decrease in communication between components of the architecture 300 reduces the area of the platform and lowers the β value, thereby improving power consumption efficiency of the processor.

Figure 5:
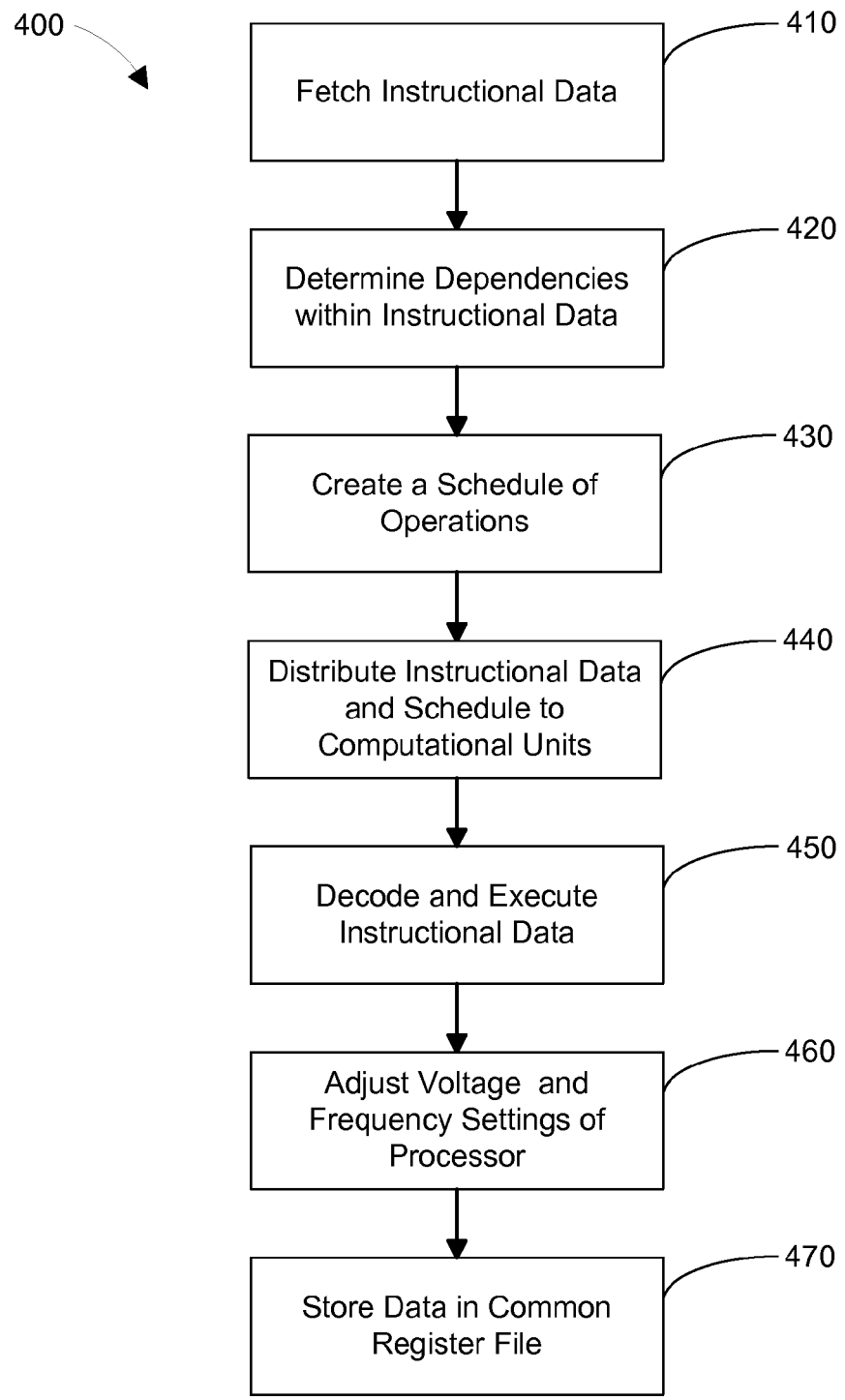
FIG. 5 discloses a flow chart of one embodiment of a method for scheduling and executing instructions over multiple computational units on a processor.

FIG. 5 discloses a flow chart of one embodiment of a method 400 for scheduling and executing instructions over multiple computational units on a processor. In the method 400, a fetch unit fetches 410 instructional data from an informational bus or data stream. In some embodiments, the fetch unit is configured to fetch up to four instructions at a time for computation among the plurality of computational units. In at least one embodiment, the informational bus is a 64-bit bus, and the fetch unit fetches four sets of 16-bit instructions.

After fetching the data, the processing unit determines 420 dependencies within the instructional data. In at least one embodiment of the method 400, the dependencies are destinations and sources of instructions to be processed and executed within the same or different clock-cycles. The processing unit creates 430 a schedule for the instructions to be processed, in a way to utilize multiple lines of computational units. The processor distributes 440 the instructional data to a plurality of computational units to compute and perform tasks according to the relevant software controlling the processor. The computational units decode and execute the data 450 according to the software and the internally created schedule.

In some embodiments of the method 400, the scheduler changes 460 the voltage and frequency settings of a processor. This may be done periodically throughout processing of instructions by calculating an average per number of instructions when multiple computational units are in use. In some embodiments, the scheduler is configured to track the schedule of each computational unit over a number of cycles and instruct the processor to adjust the processor's operating voltage and clock frequency settings to maintain a desired level of throughput. If the utilization of multiple computational units is high, the scheduler may instruct the processor to operate in a low power mode while maintaining a high throughput because of the efficient utilization of computational units. If the utilization of computational units is low, the scheduler may instruct the processor to operate in a high power mode to maintain a desired level of throughput. Finally, the decoded and executed data is stored 460 in a register file for retrieval, output, storage, or other purposes in a file shared by each of the computational units.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

An embodiment of a processing architecture includes at least one programmable component coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, including an operation to monitor a pointer movement in a web page. The web page displays one or more content feeds. In one embodiment, operations to report the pointer movement in response to the pointer movement comprising an interaction gesture are included in the computer program product. In a further embodiment, operations are included in the computer program product for tabulating a quantity of one or more types of interaction with one or more content feeds displayed by the web page.

Embodiments of the invention can take the form of an entirely hardware embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

What is claimed is:

1. A processing architecture comprising:
a fetch unit configured to fetch an input stream of instructional data, the instructional data comprising instructions; and
a scheduler to receive the stream of instructional data from the fetch unit, the scheduler configured to create a schedule for processing the instructions from the stream of instructional data and allocate the instructions and schedule for processing the instructions among a plurality of computational units, wherein the scheduler is configured to adjust voltage and frequency settings of the processing architecture, and wherein each of the plurality of computational units comprise:
a control unit coupled to the scheduler, the control unit being configured to receive and decode the instructions into decoded data; and
an execution unit coupled to a corresponding control unit, the execution unit being configured to receive and execute the decoded data.

2. The processing architecture of claim 1, further comprising a register file, the register file configured to store the decoded and executed data from the plurality of computational units.

3. The processing architecture of claim 2, wherein the register file is a common file shared by each of the execution units, and wherein the register file is configured to store the decoded and executed data and make the decoded and executed data accessible to each of the execution units.

4. The processing architecture of claim 1, wherein the scheduler is configured to optimize the throughput and power consumption of the processing architecture by instructing the processor to adjust the voltage and frequency of the processing architecture.

5. The processing architecture of claim 1, wherein the scheduler is configured to instruct the processing architecture to operate in a low power mode, reducing voltage and frequency of the processing architecture based on the utilization of the plurality of computational units.

6. The processing architecture of claim 1, wherein the scheduler is configured to instruct the processing architecture to operate in a high power mode, increasing voltage and frequency of the processing architecture based on the utilization of the plurality of computational units.

7. The processing architecture of claim 1, wherein the scheduler is configured to instruct the processing architecture to operate in a high power mode, increasing the voltage and frequency of the processing architecture to achieve a higher throughput of the processing architecture.

8. The processing architecture of claim 1, wherein the fetch unit is configured to fetch up to four instructions at a time.

9. The processing architecture of claim 1, wherein the scheduler is configured to schedule the instructions to be executed by the execution units without changing the order of instructions within the stream of instructional data.

* * * * *